C. BOMBARDIE.
STAPLE FORMING AND FEEDING MECHANISM.
APPLICATION FILED SEPT. 22, 1911.
1,203,553.
Patented Oct. 31, 1916.
2 SHEETS—SHEET 2.
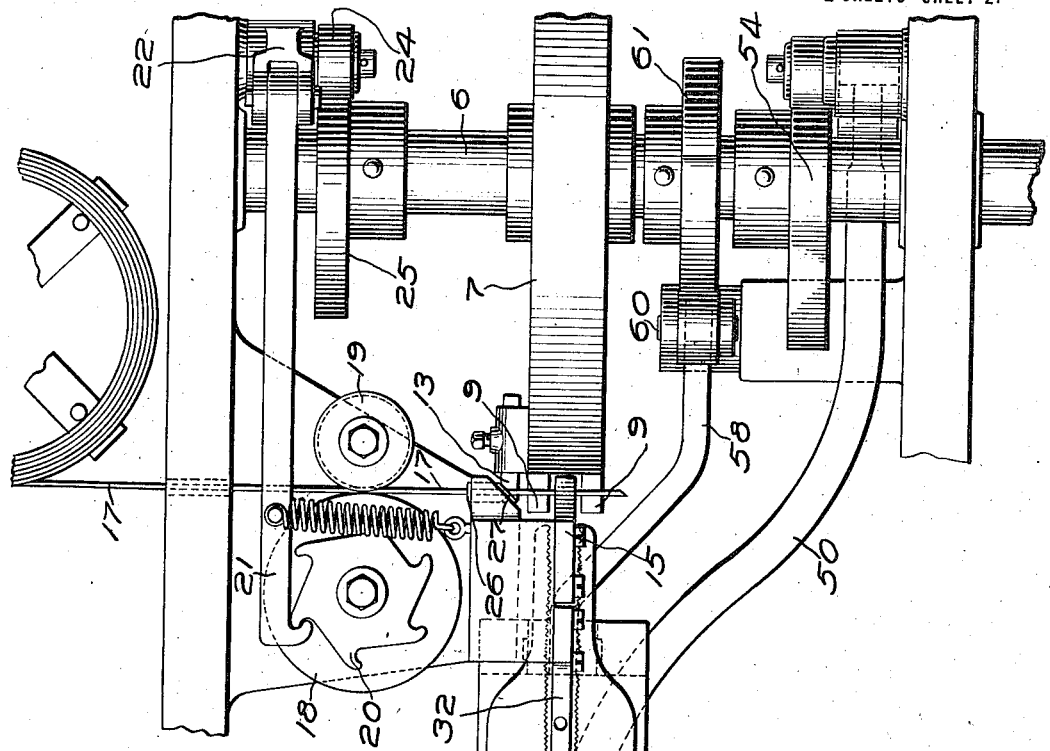
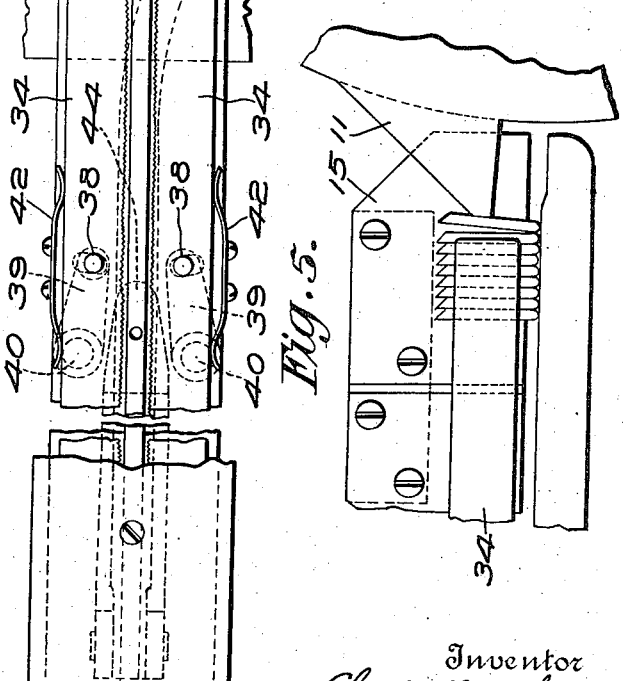

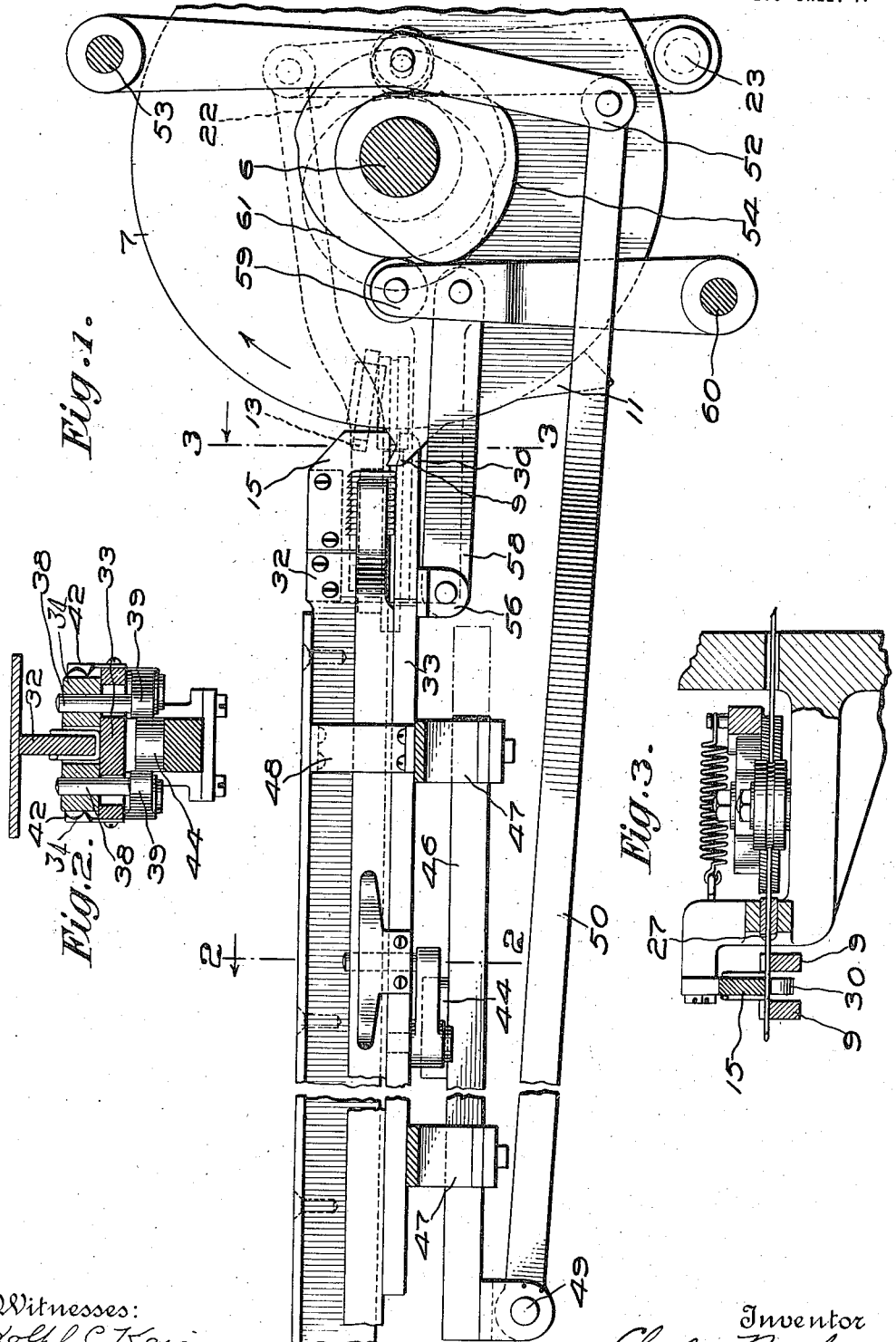

UNITED STATES PATENT OFFICE.

CHARLES BOMBARDIE, OF SOUTH BEND, INDIANA, ASSIGNOR, BY MESNE ASSIGNMENTS, TO WIREBOUNDS PATENTS COMPANY, OF KITTERY, MAINE, A CORPORATION OF MAINE.

STAPLE FORMING AND FEEDING MECHANISM.

1,203,553.  Specification of Letters Patent.  Patented Oct. 31, 1916.

Application filed September 22, 1911. Serial No. 650,769.

*To all whom it may concern:*

Be it known that I, CHARLES BOMBARDIE, a citizen of the United States, and a resident of South Bend, in the county of St. Joseph and State of Indiana, have invented an Improvement in Staple Forming and Feeding Mechanism, of which the following description, in connection with the accompanying drawings, is a specification, like characters on the drawings representing like parts.

This invention relates to staple forming and feeding mechanism and is intended to provide various improvements contributing to expedite and simplify the forming and feeding of staples.

The character of the invention may be readily understood by reference to an illustrative embodiment shown in the accompanying drawings in which—

Figure 1 is a side elevation of the illustrative embodiment; Fig. 2 is a detail section on the line 2—2 of Fig. 1; Fig. 3 is a detail section on the line 3—3 of Fig. 1; Fig. 4 is a plan view of the mechanism shown in Fig. 1; and Fig. 5 is a detached detail hereinafter more fully referred to.

Referring to Fig. 1, the illustrative mechanism comprises a cam shaft 6, driven in any suitable manner, which carries the various actuating cams for the mechanism, the same being timed as hereinafter explained. Fixed upon the shaft 6 is a forming disk 7, carrying on the periphery thereof coöperating wipers 9—9 (see Fig. 4), a staple feeding cam 11 (see Fig. 5), and a wire cutter 13 (see Fig. 4). As shown in Fig. 4, the wipers 9—9 are spaced apart sufficiently to receive between them, as the disk 7 is rotated, a former plate 15. As shown in Figs. 4 and 3, the wire or other staple material 17 may be provided on a reel from which it is fed between a knurled feed wheel 18 and an idle presser wheel 19, the latter being preferably grooved peripherally suitably to engage the wire. The feed wheel 18 is positively driven by a ratchet and pawl mechanism well shown in Fig. 4, in which the ratchet 20 is engaged by a spring pressed pawl 21, connected to a cam lever 22 pivoted at 23. The lever 22 carries a roll 24 to engage a wire feeding cam 25 on the cam shaft 6. From the feeding rolls the wire 17 enters a guide tube 26 from which the wire issues at a shearing blade 27 (see Fig. 3). The shearing blade 27 coöperates with a mating blade on the cutter 13, the latter being adjustably carried, as shown in Fig. 4, on the disk 7. The feed of the wire by the described pawl and ratchet mechanism is such that each feeding step projects the wire a distance beyond the shearing blade 27, sufficient to provide wire for a single staple when the same is severed. Preferably the blade on the cutter 13 and the shearing blade 27 sever the wire obliquely to its axis, to provide a point to facilitate driving of the staple. As the wire 17 is fed beyond the shearing blade 27, it passes beneath the former plate 15, as shown in Figs. 1 and 3 and, when severed, presents equal lengths of wire at opposite sides of the former plate 15, said equal lengths being subsequently turned upwardly to form the legs of the staple. When a length of staple wire is thus positioned beneath the former plate 15, it is severed by the cutter 13 and is then held in place, during the staple forming operation, by means of a retainer 30 (Figs. 1 and 3). Subsequently, and promptly following the severing operation, the rotation of the disk 7 presents the wipers 9—9 beneath the severed length of wire and then wipes the opposite ends of the wire upwardly to form a staple upon the former plate, with the staple legs on opposite sides of the plate, as shown in Fig. 3.

The staple formed as just described stands temporarily in such a position that it would obstruct the next following feed of the wire to present a new staple length; but in the further rotation of the disk 7, the staple feeding cam 11 engages the newly formed staple and wipes it out of the path of the wire feed, as shown in Fig. 5. Thereafter the wire feeding and staple forming operations ensue as above described.

In a staple forming and feeding mechanism it is highly desirable, and in fact substantially indispensable, that some means be provided for controlling the staples as they are formed, in order that they shall be presented in proper condition to the feeding devices, and in such mechanism heretofore used it has been attempted to accomplish this purpose by employing detent springs or the like to engage newly formed staples and to hold them in desired position until they were presented to and engaged by feeding devices. The present invention contemplates provisions which entirely obviate the necessity for any detent springs or any comparable mechanical elements; and this is effected in the illustrative mechanism by using for the former plate 15 a magnetized steel plate. The purposes for which the illustrative machine is designed render desirable the use of iron or steel staple wire, and accordingly the magnetized plate 15 coöperates with the other instrumentalities of the mechanism throughout a succession of operations—for instance, when the wire is first fed in and severed the magnetized plate 15 contributes to hold the wire in proper position; thereafter, when the staple legs are wiped upwardly, the magnetized plate 15 holds the staple in the precise position in which it is formed until it is forcibly moved by the feeding cam 11 on the disk 7; and during the operation of the feeding cam 11 the magnetized plate 15 serves to guide and control the staple, and to offer sufficient resistance to the movement of the staple so that its delivery to proper position is assured.

When the feeding cam 11 leaves a newly formed staple, the latter stands with its legs projecting vertically upward, and in the specific mechanism the staple is then uncontrolled except by the magnetized plate 15, as illustrated in Fig. 5. When the next following staple is formed and fed forward by the cam 11, the preceding staples are pushed the width of one staple toward the left in Fig. 5; and in a succession of these operations the staples are ultimately presented to feeding devices which, in the illustrative mechanism, positively engage them and feed them in a series to any desired point, as for instance to a driving point.

The illustrative feeding mechanism comprises a guide plate 32 abutting against the end of the former plate 15, and constituting in effect a continuation of the latter. As the staples are fed from the former plate 15 to the guide plate 32, they straddle the latter with their legs projecting upwardly as shown in Fig. 2, and rest upon a supporting plate 33 which in effect is an extension of the support 30, the plate 33 preferably extending throughout the feeding travel of the staples. The guide plate 32 in the specific mechanism performs merely a guiding and holding function, while the feeding operation is performed by oppositely disposed jaws 34, 34, which are serrated vertically to engage by their serrations a series of staples. The operation of the specific jaws 34, 34 is that of a so-called "four-motion feed"—that is to say, at the end of a feeding movement (toward the left in Fig. 4) the jaws move apart, they are then moved toward the right in Fig. 4, are then moved toward each other to renewed engagement with the staples, and are then moved toward the left in Fig. 4 to feed the staples through a desired feed step. The view of this "four-motion feed" mechanism in Fig. 4 is largely fragmentary, it being unnecessary to show or describe the same in great detail since the specific mechanism is not novel in my invention, save in combination with the other features recited in the claims. It will suffice to say, therefore, that each jaw 34 rests in sliding contact upon the upper face of the plate 33 as shown in Fig. 2; and each jaw is transfixed by a pin 38 mounted in a rocking arm 39 pivoted at 40 to the stationary plate 33. The pins 38 pass through elongated slots in the plate 33 which permit that movement of the pins 38 by which the jaws 34—34 are moved toward each other and separated during the "four-motion feed."

In practice it is preferred that pins 38, arms 39 and pivots 40 as illustrated in Fig. 4, be duplicated near the left hand end of the four-motion feeding devices in Fig. 4, in order that each jaw may be controlled at two points. The jaws 34—34 are pressed toward each other by means of springs 42—42, one bearing against each jaw, said springs being mounted upon the stationary plate 33. The effect of the springs 42—42 is to press both the jaws toward the guide plate 32, so that each leg of each staple will be yieldingly engaged between a jaw and a side of the guide plate 32. The jaws 34—34 are separated by forcing a wedge shaped cam 44 between the ends of the arms 39—39 which carry the pins 38—38, this cam 44 is carried upon a slide bar 46, mounted in appropriate guide ways 47—47, secured to brackets 48 depending from and secured to the guide bar 32, said slide bar 46 having pivoted to it at 49 a link 50 connecting with a cam lever 52, fulcrumed at 53 and having a roller to engage a cam 54 on the cam shaft 6. The operation of the cam 54 is such that at appropriate intervals the wedge shaped cam 44 is moved toward the right in Fig. 4, to force the pins 38—38 apart to release the staples from feeding engagement with the jaws 34—34 so that thereafter said jaws may be moved toward the right in Fig. 4, into position for renewed engagement with the staples.

Heretofore in this description it has been convenient to refer to the plate 33 as "stationary", and during the lateral movements of the jaws 34—34 said plate 33 is in fact stationary; but the endwise movement of the jaws 34—34 is effected by moving said plate 33 endwise, and for this purpose the plate 33 has a depending lug 56 which is connected by a link 58 with the cam lever 59 fulcrumed at 60, and engaging a cam 61. The operation of the cam 61 is to move endwise at proper intervals the plate 33 and those parts carried thereby including the jaws 34—34, pins 38—38, arms 39—39, pivots 40—40, springs 42—42. The timing of the four-motion feeding cams 54 and 61 will be readily understood by those skilled in the art without further description.

The operation of the described illustrative mechanism is as follows: The wire feeding pawl and ratchet mechanism feeds in a length of wire; the rotating disk 7 first presents the cutter 13 to sever the wire against the shearing blade 27; the wipers 9—9 wipe the severed wire up on opposite sides of the magnetized plate 15; the feeding cam 11 on the disk 7 moves the staple toward the left in Figs. 1, 4 and 5; and ultimately as successive staples are so formed and fed by the feeding cam 11, the staples are presented in position to be engaged by the jaws 34—34 as the latter are moved toward each other at the limit of their movement toward the right in Fig. 4, the cam 44 having been retreated toward the left in Fig. 4, in order to permit the springs 42—42 to press the jaws into feeding engagement with the staples just at or after the jaws have completed their endwise travel toward the right in Fig. 4. The staples being thus engaged by the jaws 34—34, the latter are moved toward the left preferably through a distance equal to the thickness of the staple wire, in order to feed the staples toward the left in Fig. 4. At the end of such a feed step, the cam 44 is moved toward the right again to force the jaws apart and release the staples, whereupon the jaws 34—34 are returned toward the right in Fig. 4 for renewed engagement with the staples.

It is to be understood that the invention is not essentially limited to the specific details of the above described illustrative mechanism. On the contrary, said mechanism may be variously modified within the scope of the subjoined claims.

Claims:

1. In a staple forming and feeding mechanism, the combination of wire feeding means; wire severing means; staple forming wipers; a former plate coöperating with said wipers to form a staple; magnetized means having provision for controlling the staple after severance from the wire stock by said severing means; means to feed a formed staple while under the control of said magnetized means; and a positive feed to remove the staples from the control of said magnetized means.

2. In a staple forming mechanism the combination of wipers and a magnetized former plate adjacent to and coöperating with said wipers for bending wire into staple form and controlling the staple.

3. In a staple forming and feeding mechanism, the combination of staple forming wipers; a magnetized former plate adjacent to and coöperating with said wipers for bending wire into staple form and for receiving the staple; and positive feeding means to feed staples away from said former plate.

4. In a staple forming and feeding mechanism, the combination of staple forming and positioning devices, certain thereof being magnetized to assist in positioning a formed staple.

In testimony whereof, I have signed my name to this specification, in the presence of two subscribing witnesses.

CHARLES BOMBARDIE.

Witnesses:
 ETHEL FRYE,
 BESSIE BOUSE.